US012571417B2

(12) United States Patent (10) Patent No.: US 12,571,417 B2
Tuthill et al. (45) Date of Patent: Mar. 10, 2026

(54) CONNECTOR

(71) Applicant: Hebe Studio Limited, Oxfordshire (GB)

(72) Inventors: James Tuthill, Oxfordshire (GB); Johannes Paul, London (GB); Simon Nicholls, Northhamptonshire (GB); William Windham, Oxfordshire (GB)

(73) Assignee: Hebe Studio Limited, Oxfordshire (GB)

( * ) Notice: Subject to any disclaimer, the term of this patent is extended or adjusted under 35 U.S.C. 154(b) by 0 days.

(21) Appl. No.: 18/577,020

(22) PCT Filed: Jul. 7, 2022

(86) PCT No.: PCT/EP2022/068994
§ 371 (c)(1),
(2) Date: Jan. 5, 2024

(87) PCT Pub. No.: WO2023/281019
PCT Pub. Date: Jan. 12, 2023

(65) Prior Publication Data
US 2024/0309897 A1 Sep. 19, 2024

(30) Foreign Application Priority Data
Jul. 7, 2021 (GB) ...................................... 2109832

(51) Int. Cl.
*F16B 7/04* (2006.01)
*A01K 1/035* (2006.01)
(52) U.S. Cl.
CPC ............ *F16B 7/0413* (2013.01); *A01K 1/035* (2013.01)

(58) Field of Classification Search
CPC .... F16B 7/02; F16B 7/025; F16B 7/04; F16B 7/0406; F16B 7/0413; F16B 7/182; F16B 7/185; F16B 2/02; F16B 2/04; F16B 2/14
See application file for complete search history.

(56) References Cited

U.S. PATENT DOCUMENTS 3,574,420 A * 4/1971 Waldmann ............... B25G 3/28
403/189
3,695,649 A * 10/1972 Laverone ................ F16B 9/054
403/402
(Continued)

FOREIGN PATENT DOCUMENTS

CH 675897 A5 * 11/1990 .............. F16B 9/054
CN 108468687 A 8/2018
(Continued)

OTHER PUBLICATIONS

European Patent Office; International Search Report; Mailing date: Nov. 10, 2022; Authorized Officer: Sisinni, Giovanni; pp. 1-3.
(Continued)

*Primary Examiner* — Jonathan P Masinick
(74) *Attorney, Agent, or Firm* — Finch & Maloney PLLC

(57) ABSTRACT

A connector (13) for coupling a first hollow elongate member to a second hollow elongate member, the connector comprising a linkage (15) having a first end region (17) and a second end region (19); a first expandable retainer (21) coupled to the first end region (17) of the linkage (15), and a second expandable retainer (23) coupled to the second end region (19) of the linkage (15).

17 Claims, 9 Drawing Sheets

(56)　　　　　References Cited

U.S. PATENT DOCUMENTS

| | | | | |
|---|---|---|---|---|
| 3,713,677 | A * | 1/1973 | Du Preez | F16B 7/06 |
| | | | | 403/264 |
| 3,742,582 | A * | 7/1973 | Broske | B21D 39/042 |
| | | | | 29/421.2 |
| 4,667,916 | A * | 5/1987 | Richards | F16B 9/054 |
| | | | | 403/372 |
| 4,756,639 | A | 7/1988 | Hoshino | |
| 4,802,785 | A * | 2/1989 | Richards | F16B 7/0413 |
| | | | | 248/343 |
| 4,921,370 | A * | 5/1990 | Handler | A47B 91/024 |
| | | | | 403/191 |
| 6,095,713 | A * | 8/2000 | Doyle | F16B 7/04 |
| | | | | 403/103 |
| 7,717,472 | B2 * | 5/2010 | Johnson | E21B 17/046 |
| | | | | 285/91 |
| 9,261,122 | B2 * | 2/2016 | Choy | F16B 12/40 |
| 10,995,786 | B2 * | 5/2021 | Didehvar | F16B 7/025 |
| 11,098,739 | B2 * | 8/2021 | Struhl | F16B 9/07 |
| 2005/0248156 | A1 * | 11/2005 | Hsieh | F16B 7/025 |
| | | | | 285/397 |
| 2016/0325928 | A1 * | 11/2016 | Lepek | B65G 1/0471 |
| 2019/0323531 | A1 | 10/2019 | Wang | |

FOREIGN PATENT DOCUMENTS

| | | | | |
|---|---|---|---|---|
| DE | 1932115 | A1 * | 1/1971 | |
| DE | 2403832 | A1 | 8/1975 | |
| DE | 29505791 | U1 * | 7/1995 | |
| DE | 202018105903 | U1 * | 1/2020 | F16B 7/0466 |
| EP | 0477707 | B1 | 7/1994 | |
| EP | 0628734 | A1 * | 12/1994 | E04B 1/5831 |
| GB | 2093517 | A | 9/1982 | |
| GB | 2451095 | A | 1/2009 | |
| NL | 7701817 | A | 7/1977 | |
| WO | WO-9300516 | A1 * | 1/1993 | F16B 7/025 |
| WO | 2015/170222 | A1 | 11/2015 | |

OTHER PUBLICATIONS

European Patent Office; Written Opinion of the International Searching Authority; pp. 1-12; Authorized Officer; Sisinni, Giovanni; Mailing date: Nov. 10, 2022.

* cited by examiner

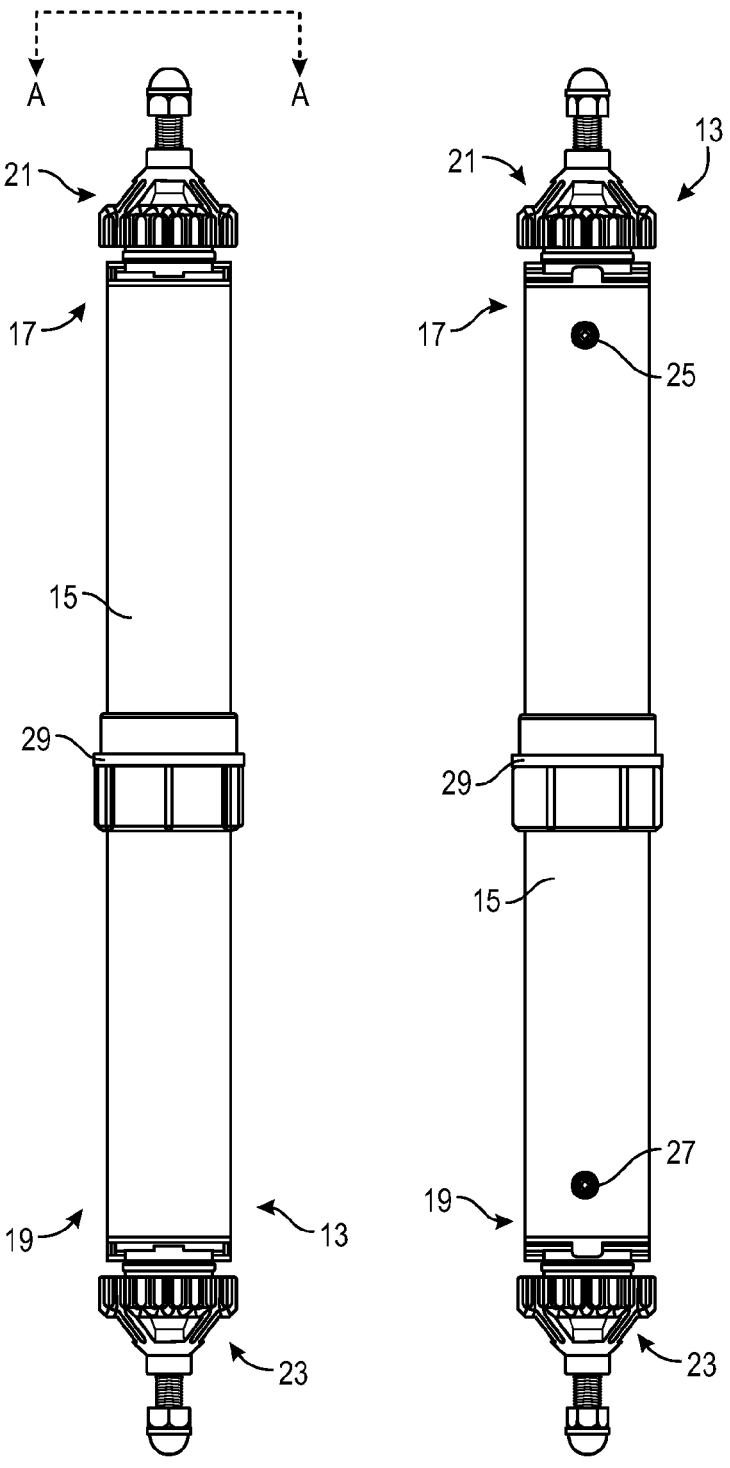
FIG. 2          FIG. 3

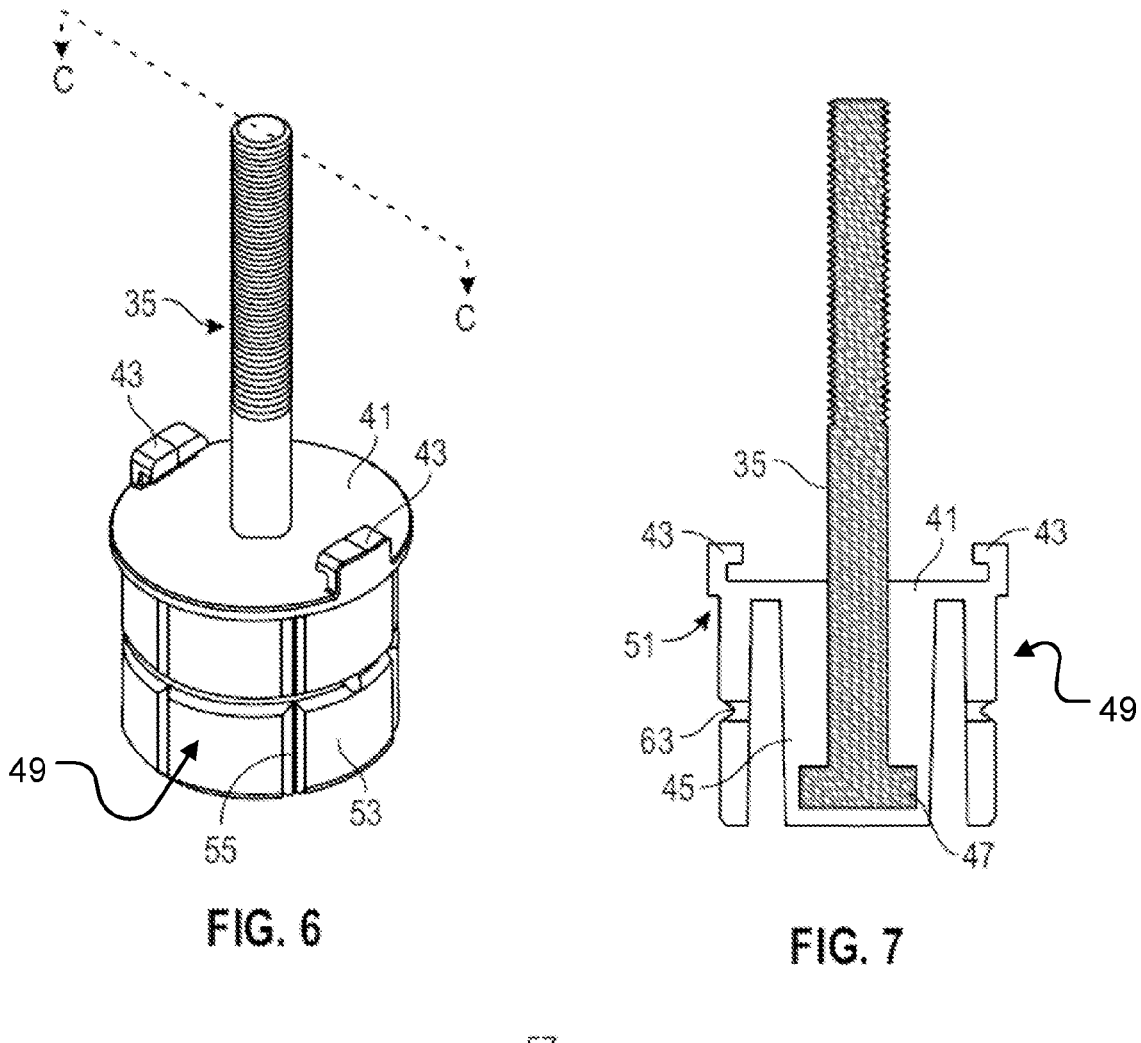
FIG. 6
FIG. 7
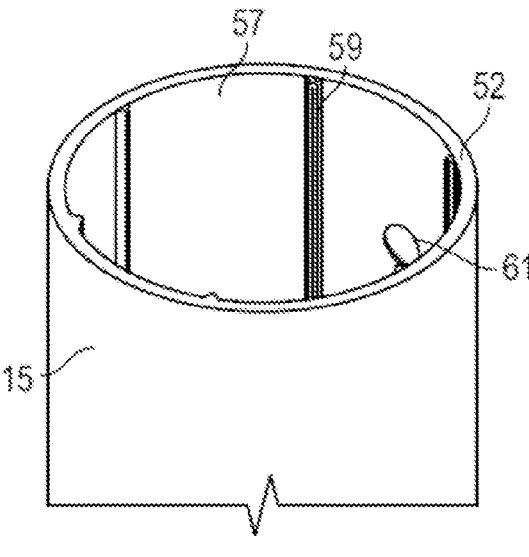
FIG. 8

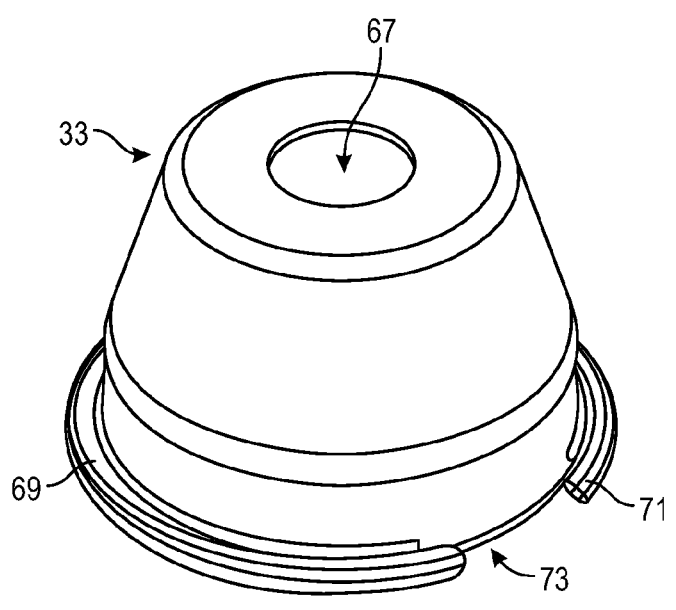
FIG. 9
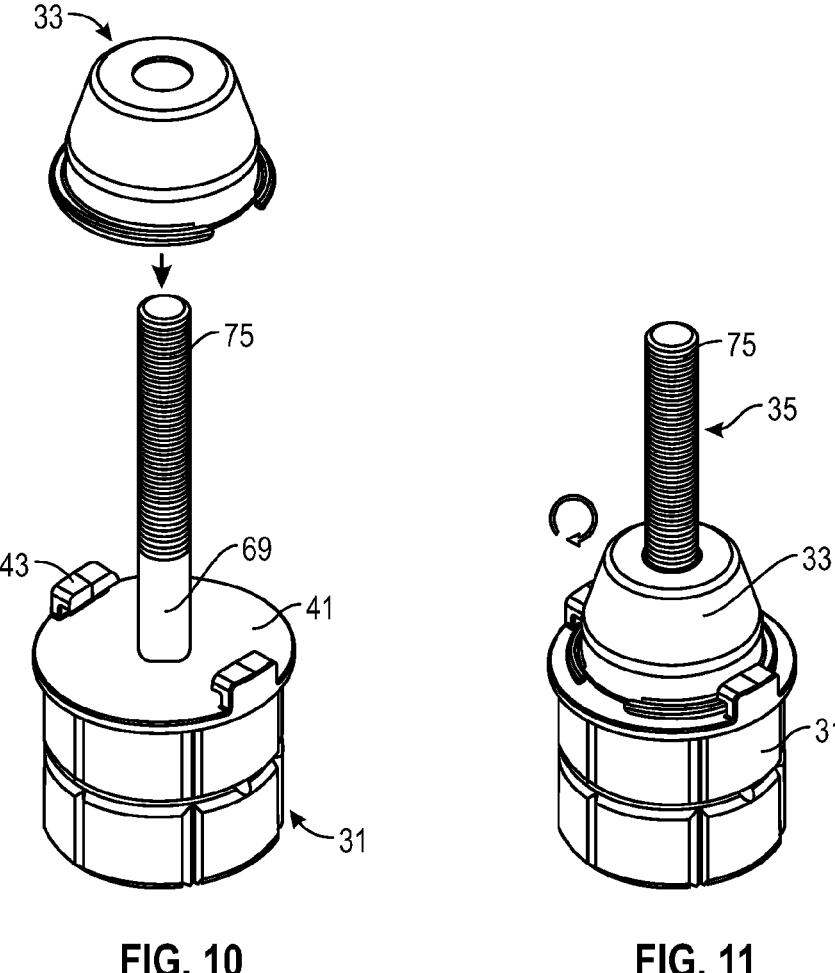
FIG. 10          FIG. 11

CONNECTOR

This application is a U.S. national stage application under 35 U.S.C. § 371 of PCT International Application Serial No. PCT/EP2022/068994, which has an international filing date of Jul. 7, 2022, designates the United States of America, and claims the benefit of GB Application No. 2109832.2, which was filed on Jul. 7, 2021, the disclosures of which are hereby expressly incorporated by reference in their entirety.

This disclosure relates to connectors, particularly but not exclusively to a connector for coupling a first hollow elongate member to a second hollow elongate member. In one illustrative arrangement, the connector may be employed to couple hollow elongate members that function as supports of a cat tree.

The connector that is the subject of this disclosure is described below in connection with a cat-tree and tubular support poles for such a tree. Whilst this is one envisaged implementation of the teachings of this disclosure, it should be noted that the connector disclosed herein can be used to couple a variety of different hollow elongate members, and as such references hereafter to tubular elongate members and/or cat tree supports should not be construed as limiting the scope of the present disclosure in any way.

BACKGROUND

FIG. 1 is a schematic representation of a previously proposed cat tree 1. The cat tree 1 comprises, in this instance, three elongate tubular supports 3 that are each configured to be fixed at respective ends to the floor and ceiling of a building. As shown in FIG. 1, the tubular supports can be connected to one another by transverse members 5 so that a cat can climb between the supports. A variety of platforms 7, feeding stations 9 and cat shelters 11 can also be clamped to the supports so that a cat can climb up into the tree and sit/eat in an elevated position with respect to the floor.

Cat trees of the type depicted in FIG. 1 are typically sold as kits, often by mail order, and in order for the elongate tubular supports to be sent through the mail or delivered by courier to consumers it is necessary for the tubular supports to be reduced in length for transport. Typically, as in the arrangement shown in FIG. 1, this is accomplished by providing elongate tubular supports which consist of two or more tubes that are telescopically received one inside the other. In this way, the elongate support can be telescopically reduced in length for transport, and then expanded to a desired length by the consumer before being locked in a selected expanded position.

Whilst this arrangement allows users to construct cat trees of the type shown in FIG. 1, a telescopic tubular support necessarily requires at least one of the tubes of the support to have a smaller diameter than at least one other tube of the support (so that the smaller diameter tube can telescope within the larger diameter tube). As a consequence of this diametric difference it is possible for the inner tube to pivot relative to the outer tube so that the inner and outer tubes are no longer aligned—particularly when the support is loaded by a cantilevered load (such as a cat sat within the cat shelter 11). This relative movement can give the impression that the tube is wobbly, reducing both the consumers and the cat's confidence that the tree has been robustly constructed, and is not in danger of collapse.

It would be beneficial if a more robust way of coupling elongate hollow members, such as tubes, could be devised. The connector disclosed herein has been devised with the foregoing in mind.

SUMMARY

In accordance with a presently preferred arrangement there is provided a connector for coupling a first hollow elongate member to a second hollow elongate member, the connector comprising a linkage have a first end region and a second end region; a first circumferentially expandable retainer coupled to the first end region of the linkage, and a second circumferentially expandable retainer coupled to the second end region of the linkage.

In another implementation, there is provided a connector for coupling a first hollow elongate member to a second hollow elongate member, the connector comprising a linkage having a first end region and a second end region; a first expandable retainer coupled to the first end region of the linkage, and a second expandable retainer coupled to the second end region of the linkage.

Preferably said first expandable retainer is capable of being inserted into said first hollow elongate member, and said second expandable retainer is capable of being inserted into said second hollow elongate member.

In an envisaged implementation relative rotation of said linkage and said first expandable retainer in a first direction causes said first expandable retainer to expand, and relative rotation of said linkage and said first expandable retainer in a second opposite direction causes said first expandable retainer to contract.

In one arrangement relative rotation of said linkage and said first expandable retainer in said first direction causes said first expandable retainer to move towards said linkage and expand, and relative rotation of said linkage and said first expandable retainer in said second opposite direction causes said first expandable retainer to move away from said linkage and contract In one arrangement relative rotation of said linkage and said second expandable retainer in a first direction causes said second expandable retainer to expand, and relative rotation of said linkage and said second expandable retainer in a second opposite direction causes said second expandable retainer to contract.

Preferably, relative rotation of said linkage and said second expandable retainer in said first direction causes said second expandable retainer to move towards the linkage and expand, and relative rotation of said linkage and said second expandable retainer in said second opposite direction causes said second expandable retainer to move away from said linkage and contract.

The first and second retainers may be configured so that, in their unexpanded states, the retainers abut against internal surfaces of said first and second hollow elongate members respectively when said first and second retainers have been inserted therein. The parts of said first and second retainers that bear upon the respective internal surfaces of the first and second hollow elongate members may be of a high-friction material.

The first and/or second retainers may comprise a base, an expander, a diametrically expandable member and a bolt. The expander may be coupled to the base. A head portion of the bolt may be received in the base, the expander may include a through-hole, and the expander may be arranged so that the bolt extends from the base through the through hole and projects therefrom in a direction away from the linkage.

Preferably the expandable member is rotatably mounted on the bolt and rotation of the expandable member in a first direction about the bolt causes the expandable member to move towards the expander, whereupon the expander bears upon the expandable member to expand said expandable member.

Preferably rotation of the expandable member in a second opposite direction about the bolt causes the expandable member to move away from the expander, whereupon the expander bears to a lesser extent upon the expandable member to allow said expandable member to contract.

In one implementation, the expandable member may comprise an annular support and a plurality of moveable lobes resiliently coupled to said support for movement relative thereto. The annular support may be internally threaded and the bolt may be externally threaded, the annular support thread being complementary to the bolt thread.

The connector may further comprise a cap, the cap being coupled to the bolt to prevent the annular support from becoming detached from the bolt.

The base may include a skirt, said skirt being push-fittable into the linkage. An internal surface of the linkage and an external surface of the skirt may include complementary features that engage to resist rotation of the skirt in the linkage. The linkage may be a hollow elongate member.

In one arrangement the linkage and the first and second hollow elongate members are all tubular members having a circular cross-sectional shape. The connector may further comprise a stop received on said linkage, the stop functioning to restrict the extent to which the linkage can be inserted into a said hollow elongate member.

Another aspect of the disclosure relates to a tubular support for a cat-tree, the support comprising a first hollow tubular pole, a second hollow tubular pole and a connector of the type described herein, the first expandable retainer being insertable into the first hollow tubular pole and the second expandable retainer being insertable into the second hollow tubular pole to thereby couple together the first and second hollow tubular poles.

Another aspect of the disclosure relates to a cat-tree kit comprising a plurality of hollow tubular poles, a plurality of connectors of the type described herein for coupling pairs of said hollow tubular poles together, and one or more accessories selected from: a platform, a feeding station and a cat shelter; said one or more accessories being connectable to a said hollow tubular pole.

In another arrangement there is provided a connector for coupling a first hollow tubular support of a cat tree to a second hollow tubular support of a cat tree, the connector comprising a hollow tube having a first end region and a second end region; a first expandable retainer coupled to the first end region of the linkage, and a second expandable retainer coupled to the second end region of the linkage, the first expandable retainer being insertable into an end of the first hollow tubular support and the second expandable retainer being insertable into an end of the second hollow tubular support; wherein rotation of each retainer relative to the hollow tube cause the retainer to expand and couple the connector to the associated hollow tubular support.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 2 is a schematic elevation of a connector for coupling a first hollow elongate member to a second hollow elongate member;

FIG. 3 shows the connector of FIG. 2 rotated through 90 degrees;

FIG. 6 is a perspective view of components of a retainer;

FIG. 7 is a cross-sectional view of the components shown in FIG. 6 along the line C-C;

FIG. 8 is a perspective view of an end region of a linkage of the connector;

FIG. 9 is a perspective view of an expander;

FIGS. 10 and 11 depict the assembly of the components depicted in FIGS. 6 and 9;

DETAILED DESCRIPTION

Figure 1:
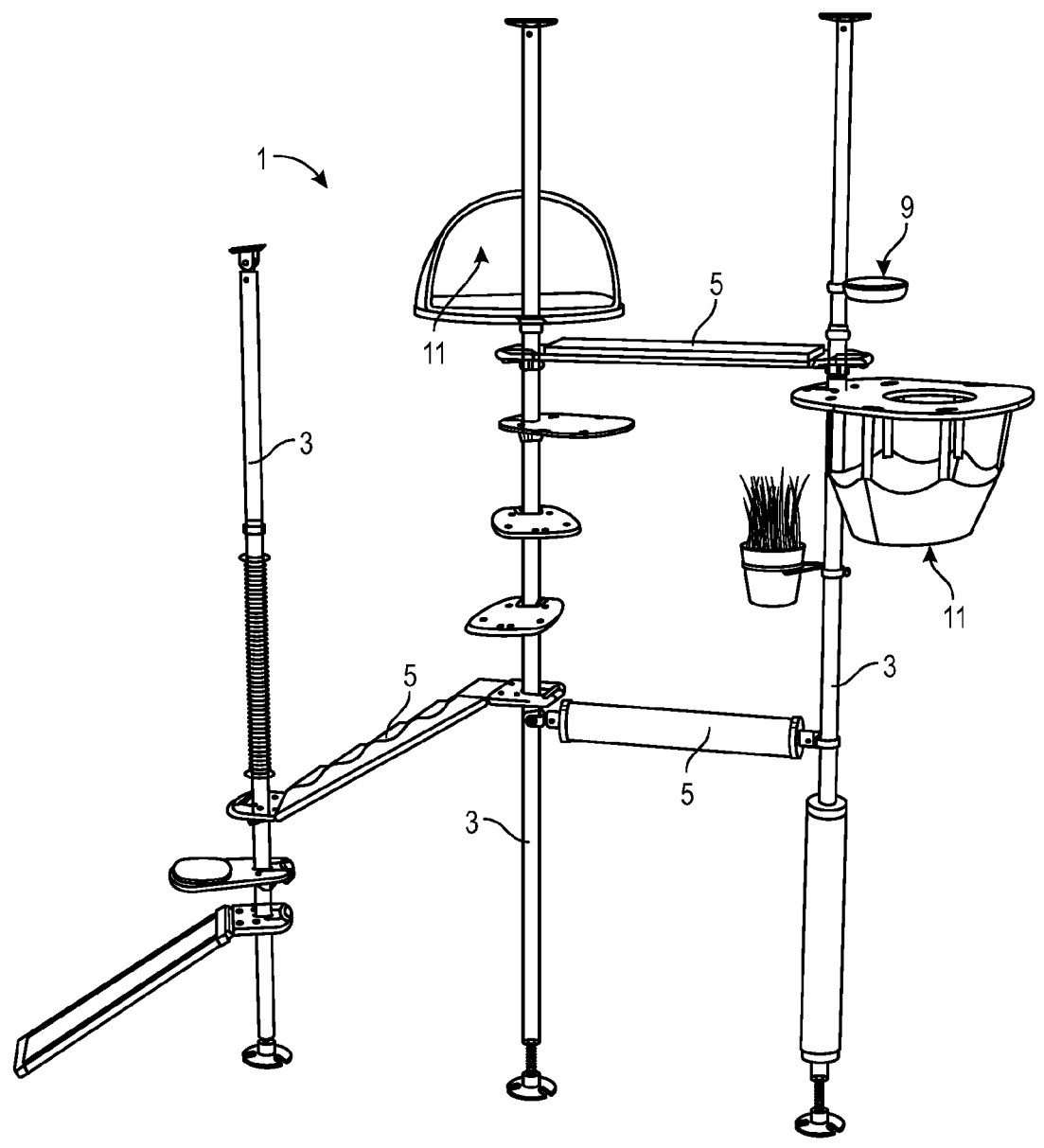
FIG. 1 is a schematic representation of a previously proposed cat tree.

Referring now to FIGS. 2 and 3 of the drawings, there is depicted a connector 13 that is suitable for coupling a first hollow elongate member to a second hollow elongate member. The hollow elongate members could each be a length of tubing, for example.

The connector 13 comprises a linkage 15 that has a first end region 17 and a second end region 19. A first expandable retainer 21 is coupled to the first end region 17 of the linkage 15, and a second expandable retainer 23 is coupled to the second end region 19 of the linkage 15. In this particular example, the linkage is a hollow tube and the retainers 21, 23 are fitted into respective ends of the linkage. As shown in FIG. 3, a fixing 25, 27 (such as a screw, for example) extends through the peripheral wall of the linkage 15 in each end region and engages with a part of each retainer within the tube. The fixings keep the retainers fitted to the linkage, and resist rotation of the retainers about a longitudinal axis defined by the linkage.

An insertion stop 29 is provided and extends circumferentially around the periphery of the linkage 15 generally midway between the first and second end regions 17, 19. As will later be described in detail, the insertion stop functions to limit the extent to which the connector 13 can be inserted into a hollow elongate member.

Figures 4, 5:
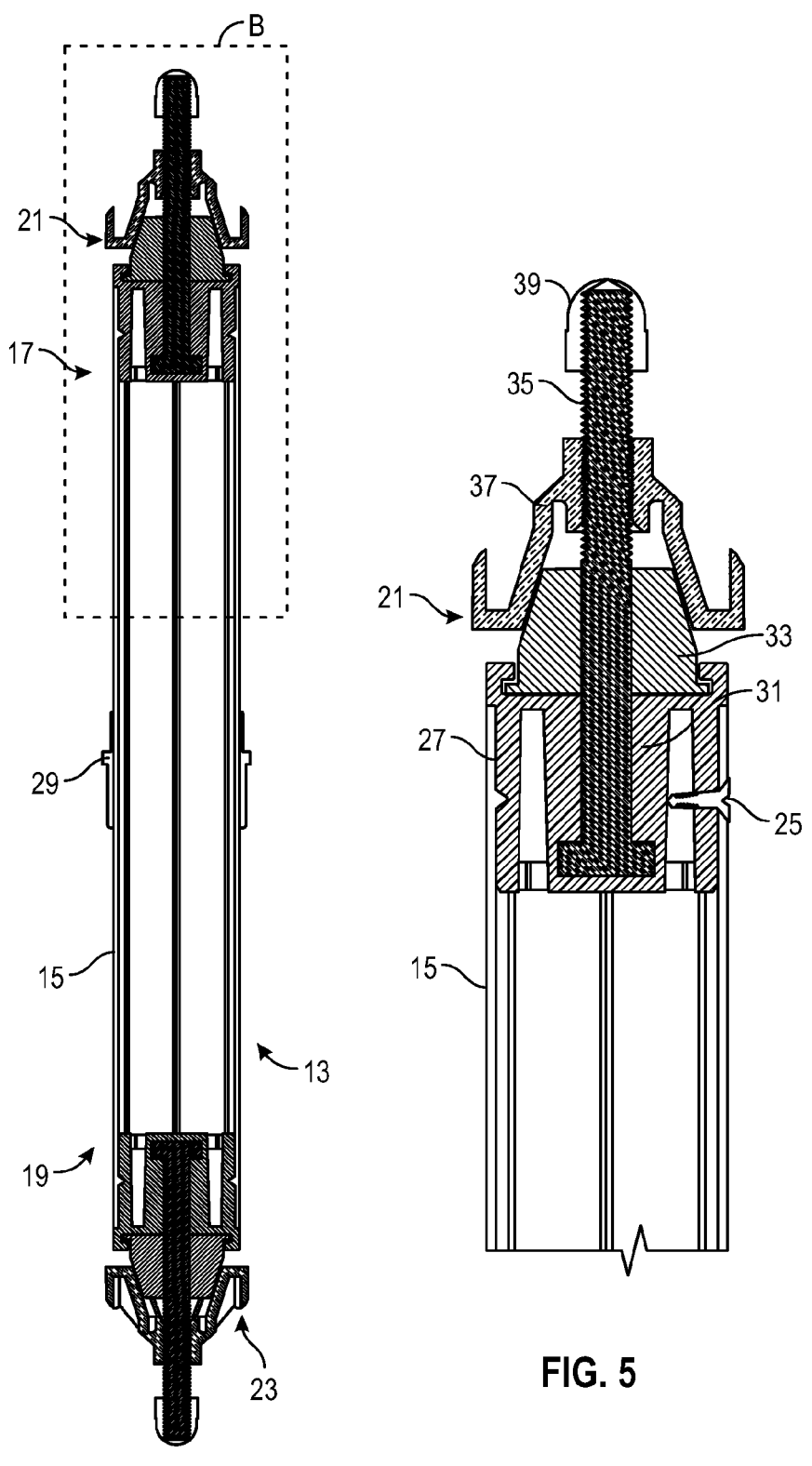
FIG. 4 is a cross-sectional view of the connector of FIG. 1 along the line A-A.
FIG. 5 is an enlarged view of region B of FIG. 4.

FIG. 4 is a longitudinal cross-section along the line A-A of FIG. 2, and FIG. 5 is an enlarged view of the region labelled B in FIG. 4. The first and second expandable retainers 21, 23 are similar, and for brevity only the first retainer 21 will now be described with reference to FIGS. 4 and 5 of the drawings.

The retainer 21 comprises a base 31, an expander 33, a bolt 35, a diametrically expandable member 37, and a cap 39. Referring now to FIGS. 6 and 7, the base comprises a transverse wall 41 from the periphery of which first and second diametrically opposed retaining lugs 43 extend. The lugs 43 are generally L-shaped in cross-section. The transverse wall 41 includes a central aperture through which the bolt 35 extends, and a main body 45 of the base 31 is provided around (for example, moulded around) a head portion 47 of the bolt 35 to fixedly attach the bolt to the base 31 so that the bolt cannot move relative thereto. A skirt 49 extends from the transverse wall 41 in an opposite direction to the lugs 43 and is recessed from the periphery of the transverse wall to form a circumferential ledge 51 against which a peripheral wall 52 (FIG. 8) of the linkage abuts when the base is push-fitted into an end of the linkage 15.

An external face 53 of the skirt 49 is provided with a plurality of circumferentially spaced longitudinal grooves 55, and—as shown in FIG. 8—an internal wall 57 of the linkage 15 is provided with a plurality of complementary circumferentially-spaced inwardly-projecting ribs 59. With the grooves and ribs aligned, the base can be push fitted into an end of the linkage, whereupon the aligned ribs and grooves will function to resist spinning of the base in the linkage when a rotational force is applied to the bolt. The linkage is also provided with an aperture 61 through which the fixing 25 can be inserted to engage with a complementary aperture 63 in the skirt of the base. When so engaged, the fixing 25 also acts to resist spinning of the base in the linkage when a rotational force is applied to the bolt.

As shown in FIG. 9 of the drawings, the expander 33 is generally frustoconical, and has a central bore 67 that is larger in diameter than a non-threaded portion 69 of the bolt 35 and an externally threaded portion 75 of the bolt 35. A peripheral region of the expander 33 is provided with a pair of peripheral flanges 69, 71 that are separated from one another by a pair of diametrically opposite recesses 73 (one of which can be seen in FIG. 9). The recesses are sized so that the expander can be fitted over the bolt 35 and lugs 43 (as shown in FIG. 10) until the flanges abut against the transverse wall 41 of the base 31, whereupon the externally threaded portion 75 of the bolt 35 projects through the bore 67 of the expander. The expander can then be rotated (as shown in FIG. 11) until the flanges extend under the lugs and the expander 33 is securely coupled to the base 31.

Figure 12:
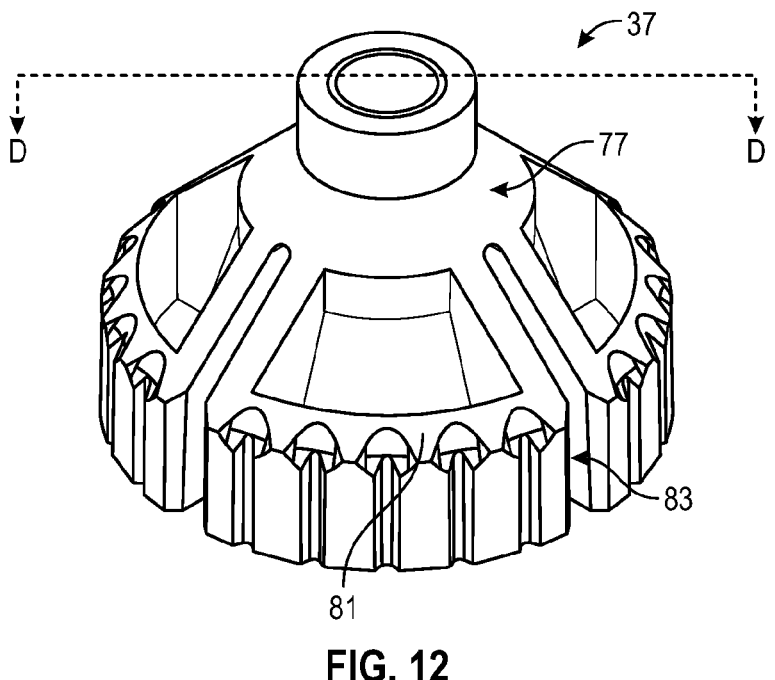
FIG. 12 is a perspective view of an expandable member.
Figure 13:
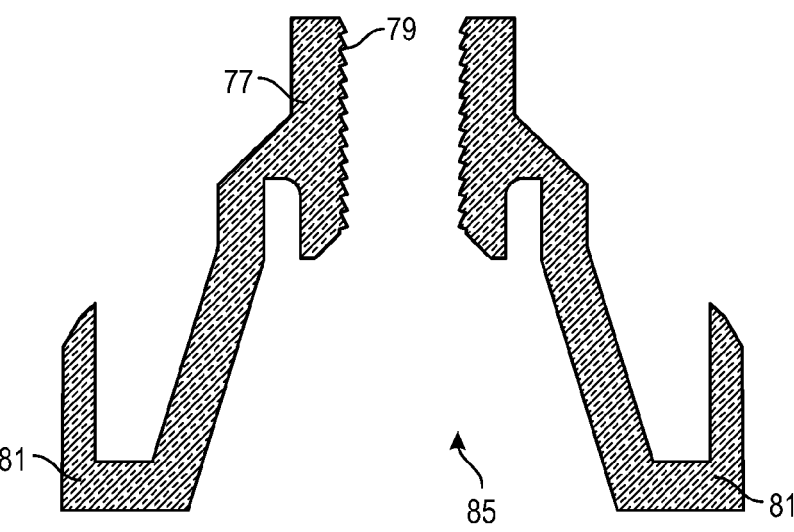
FIG. 13 is a schematic cross-sectional view along the line D-D of FIG. 12

As shown in FIGS. 12 and 13, the expandable member 37 comprises an annular support 77 that has an internally threaded surface 79 which is complementary to the external threaded portion 75 of the bolt 35. Four moveable limbs 81, each separated from neighbouring limbs by respective channels 83, extend outwardly from the support 77 and co-operate with the support to define a generally frustoconical internal cavity 85. The internal cavity 85 is sized so that movement of the expander 33 into the cavity will bring the external surface of the expander into contact with the lateral walls of the internal cavity. As the expander moves further into the internal cavity, the moveable limbs 81 move apart from one another, and the circumference of the circle defined by the limbs increases.

In the assembled retainer, rotating the expandable member on the bolt causes the threaded internal surface of the expandable member to co-operate with the externally-threaded surface of the bolt to cause the expandable member to move towards or away from (depending on the direction of rotation) the captive head of the bolt. As the expandable member is rotated in one direction it moves towards the captive head of the bolt and the expander moves into the internal cavity of the expandable member, and causes the limbs to move outwardly to increase the circumference of the circle that they define. Similarly, as the expandable member is rotated in the opposite direction it moves away from the captive head of the bolt and the expander moves out of the internal cavity of the expandable member, causing the limbs to move inwardly to reduce the circumference of the circle that they define.

In the preferred arrangement, the expandable member is configured so that when the circle defined by the lobes is smallest (i.e. when the expander has been withdrawn from the cavity), the diameter of that circle is similar to the internal diameter of the hollow elongate members that the connector is to couple together. In this way, once the retainer of the connector has been push-fitted into the hollow elongate member (with the limbs flexing as necessary), the outer peripheral surface of the limbs will bear upon the internal surface of the hollow elongate member with sufficient frictional force to hold the expandable member stationary as rotation of the linkage of the connector is initiated. To facilitate this, the outer peripheral surface of the limbs may be of a high-friction material, such as rubber.

As the connector linkage is further rotated, the expandable member is drawn towards the captive head of the bolt and the expander moves into the internal cavity of the expandable member. Continued rotation of the connector linkage causes the limbs to be driven radially outwardly into tight abutment with the internal wall of the hollow elongate member, thereby securely coupling the connector to the hollow elongate member. Rotating the connector linkage in the opposite direction causes the expandable member to move away from the expander towards a position where the connector can be withdrawn from the hollow elongate member.

The cap 35, as will no doubt be appreciated by those persons of skill in the art, merely functions to stop the expandable member from moving to a position where it becomes detached from the bolt 31.

Figures 14, 15:
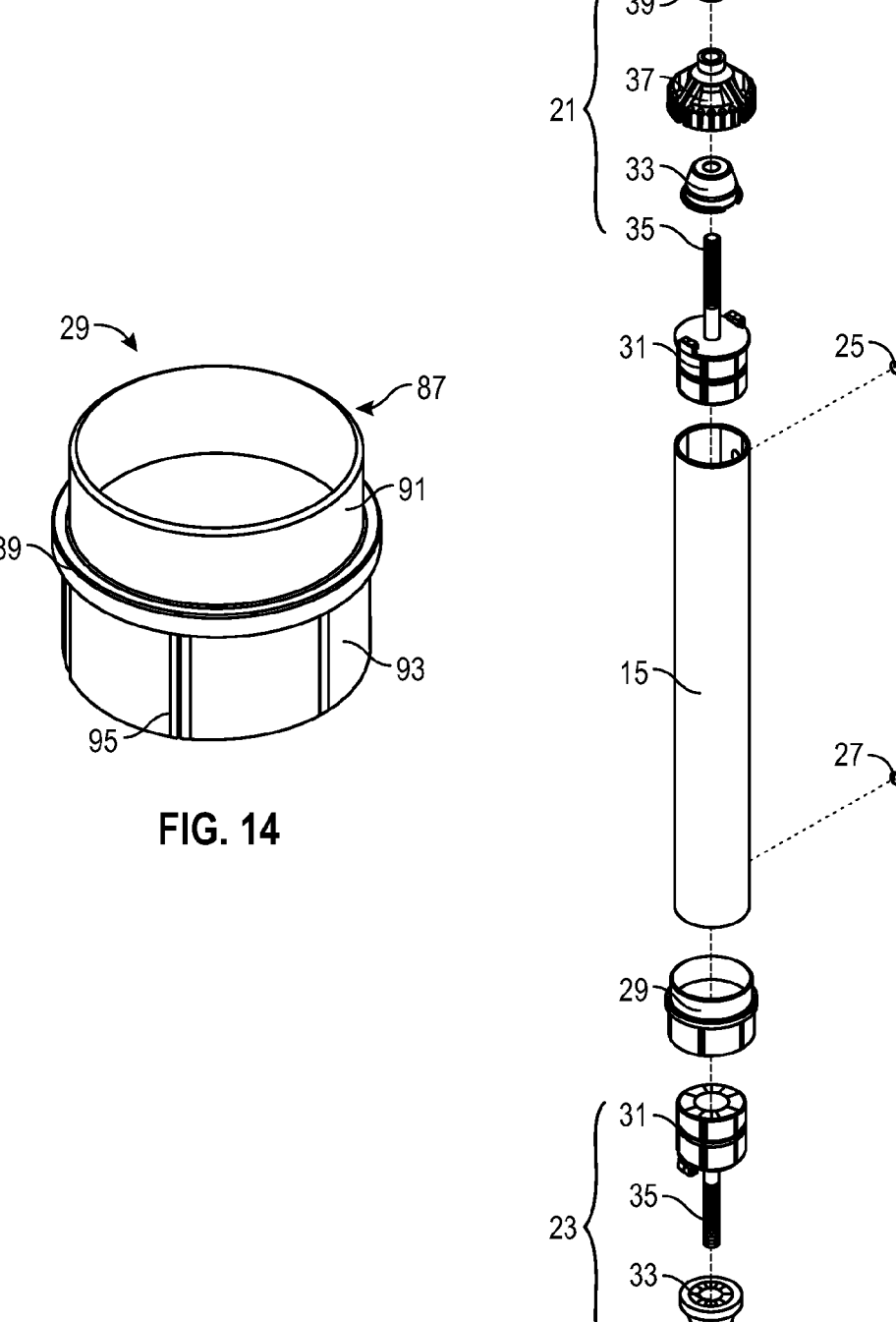
FIG. 14 is a schematic perspective view of an insertion stop.
FIG. 15 is an exploded view of the connector depicted in FIG. 2.

FIG. 14 is a schematic perspective representation of the insertion stop 29. In this implementation, the stop comprises a cylinder 87 that is configured to be slid onto the linkage 15. The cylinder is provided with a circumferential rib 89 that divides the cylinder into two portions 91, 93—a first 91 for engaging with a first hollow elongate member and a second 93 for engaging with a second hollow elongate member. In this instance, the second portion of the cylinder includes a plurality of longitudinal ribs 95 to enhance the frictional engagement of the second elongate member with the stop 29. Optionally, the first portion may also include longitudinal ribs.

FIG. 15 is an exploded view of the connector showing how the various components fit together. As shown, the insertion stop 29 is slid onto the linkage 15, whereupon the base 31 of the first retainer 21 is push fitted into one end of the linkage 15 and the base 31 of the second retainer 23 is push fitted into the other end of the linkage 15. Expanders 33 are then fitted over the bolts 35 that are projecting from the bases 31, and expandable members 37 are screwably engaged with the bolts 35. Finally, a cap 39 is screwed onto each bolt 35 to stop the expandable members 37 and the bolts 35 from being decoupled.

As will no doubt be appreciated by persons of skill in the art, the threads of the bolt and expandable member of the first retainer and the threads of the bolt and expandable member of the second retainer are arranged so that rotating the linkage in a common direction causes the expandable member of the first and the second retainers to be expanded.

Figures 16, 17, 18:
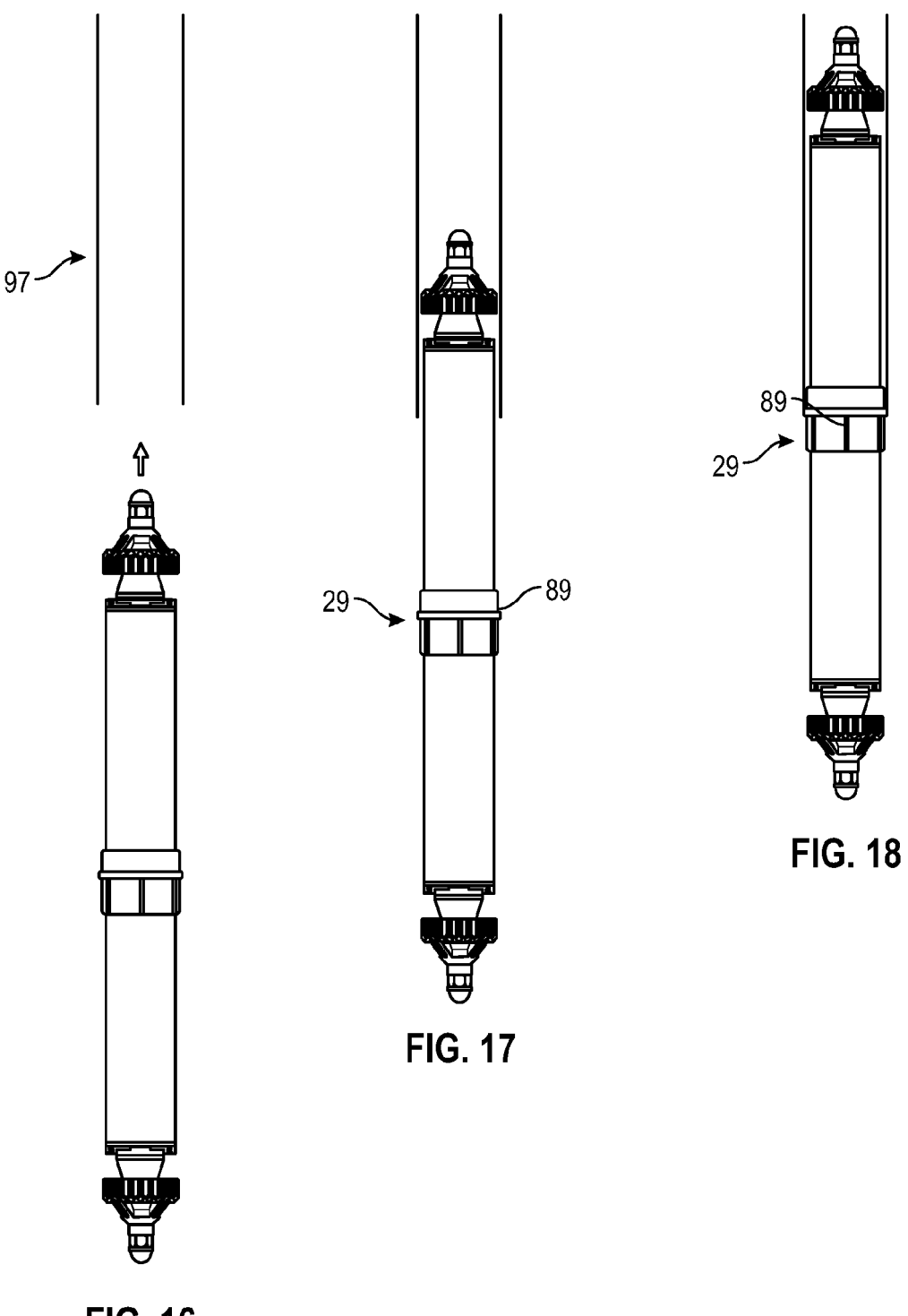
FIGS. 16 to 21 are schematic depictions of a connector of the type disclosed herein being used to couple first and second hollow elongate members together.

FIGS. 16 to 21 are schematic depictions of the manner in which a connector of the type disclosed herein may be used to couple first and second hollow elongate members together. In a first step, with the expandable members of each retainer disengaged from their associated expanders, one retainer of the connector is offered up to the open end of a first elongate hollow member 97 (FIG. 6). The linkage is them pushed into the elongate hollow member (FIG. 17) until the end of the elongate hollow member abuts against one side of the circumferential rib 89 of the stop 29 (FIG. 18).

The linkage 15 is then rotated in a clockwise direction (FIG. 19), which draws the expandable member of the first retainer against the expander of the first retainer, and causes the expandable member of the first retainer to be tightly abutted against the internal surface of the first elongate member 97.

Figures 19, 20, 21:
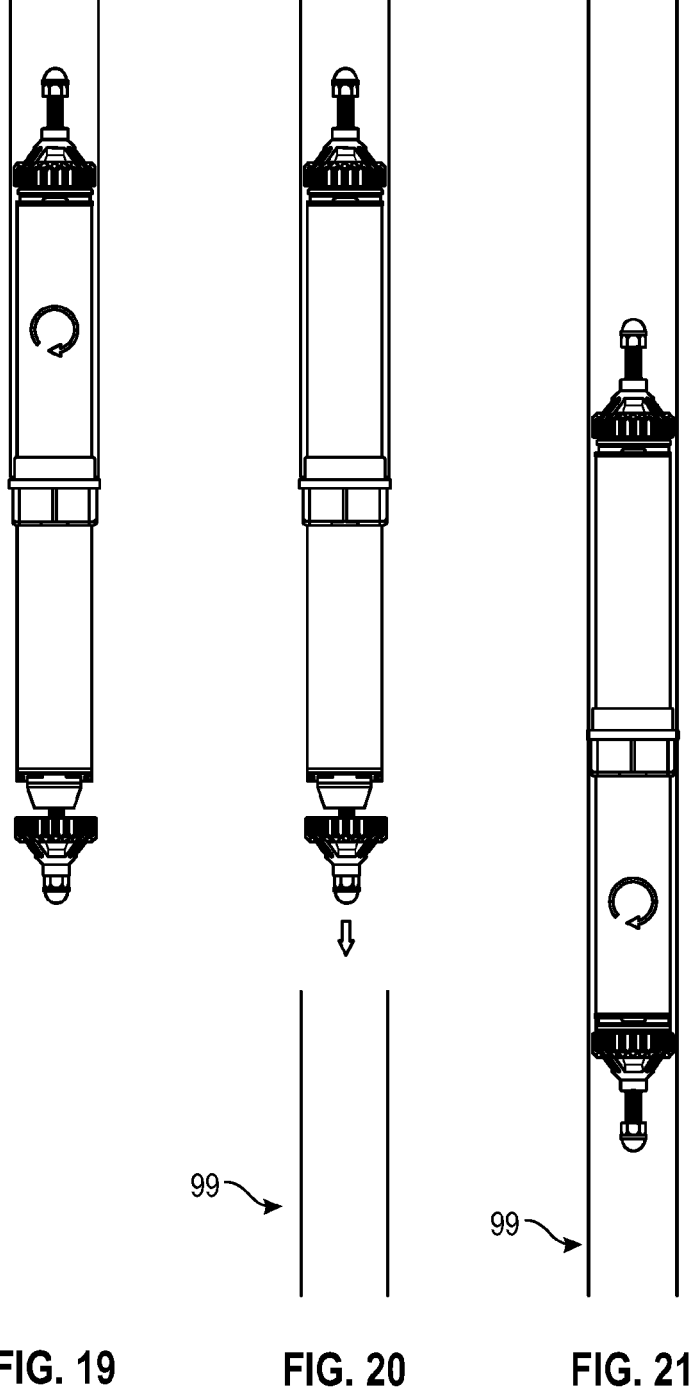

Next, the other end of the connector is offered up to a second elongate hollow member 99 (FIG. 20). The linkage (with first elongate hollow member attached) is then pushed into the second elongate hollow member 99 until the end of the second elongate hollow member abuts against the other side of the circumferential rib 89 of the stop 29. Once so located, rotating the second elongate hollow member in a clockwise direction (FIG. 21) causes the expandable member of the second retainer to be drawn against the expander, whereupon the expandable member of the second retainer expands to be tightly abutted against the internal surface of the second elongate member 99.

It will be apparent from the foregoing, that as each end of the connector is tightly abutted against the internal surface of each hollow elongate member, the extent to which the elongate members can pivot relative to each other (for example by virtue of the application of a force at 90 degrees to the stop 29) is significantly reduced as compared with a telescopic tubular support. A consequence of this is that a pole of the type depicted in FIG. 21 is significantly less wobbly and hence more robust than a telescopic alternative.

It is also the case that the connector disclosed herein enables hollow elongate members that are too long to be posted or sent by courier to be broken down into smaller constituent parts that can be mailed or sent by courier, and then reassembled by the recipient without any significant loss of structural integrity as compared with a single longer elongate hollow member.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the disclosure.

For example, whilst it is envisaged that in many applications the first and second hollow elongate members will have a bore that is circular in cross-section, it should be remembers that the external shape of these members need not be circular or indeed be the same. One could imagine an elongate member that is—in cross-section—externally triangular and internally circular connecting to a second elongate member that is—in cross-section—externally square and internally circular.

It should also be noted that whilst particular combinations of features have been described herein, the scope of the present invention is not limited to the particular combinations disclosed herein, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A connector for coupling a first hollow elongate member to a second hollow elongate member, the connector comprising:
   a linkage having a first end region and a second end region;
   a first expandable retainer comprising a base, an expander, a diametrically expandable member and a bolt; said base of said first expandable retainer further comprising a skirt push-fittable into the first end region of the linkage to couple the first expandable retainer to the first end region of the linkage, and
   a second expandable retainer comprising a base, an expander, a diametrically expandable member and a bolt; said base of said second expandable retainer further comprising a skirt push-fittable into the second end region of the linkage to couple the second expandable retainer to the second end region of the linkage, wherein:
   said first expandable retainer is capable of being inserted into said first hollow elongate member, and said second expandable retainer is capable of being inserted into said second hollow elongate member;
   relative rotation of said linkage and said first expandable retainer in a first direction causes said first expandable retainer to move towards said linkage and expand, and relative rotation of said linkage and said first expandable retainer in a second opposite direction causes said first expandable retainer to move away from said linkage and contract; and
   relative rotation of said linkage and said second expandable retainer in said first direction causes said second expandable retainer to move towards the linkage and expand, and relative rotation of said linkage and said second expandable retainer in said second opposite direction causes said second expandable retainer to move away from said linkage and contract.

2. A connector according to claim 1, wherein said first and second expandable retainers are configured so that, in their unexpanded states, the first and second expandable retainers abut against respective internal surfaces of said first and second hollow elongate members respectively when said first and second expandable retainers have been inserted therein.

3. A connector according to claim 2, wherein parts of said first and second expandable retainers that bear upon the respective internal surfaces of the first and second hollow elongate members are of a high-friction material.

4. A connector according to claim 1, wherein for each of said first and second expandable retainers: a head portion of the bolt is received in the base, the expander includes a through-hole, and the expander is arranged so that the bolt extends from the base through the through-hole and projects therefrom in a direction away from the linkage.

5. A connector according to claim 4, wherein the diametrically expandable member is rotatably mounted on the bolt and rotation of the diametrically expandable member in a first direction about the bolt causes the diametrically expandable member to move towards the expander, whereupon the expander bears upon the diametrically expandable member to expand said diametrically expandable member.

6. A connector according to claim 5, wherein rotation of the diametrically expandable member in a second opposite direction about the bolt causes the diametrically expandable member to move away from the expander, whereupon the expander bears to a lesser extent upon the diametrically expandable member to allow said diametrically expandable member to contract.

7. A connector according to claim 1, wherein for each of said first and second expandable retainers: the diametrically expandable member comprises an annular support and a plurality of moveable lobes resiliently coupled to said annular support for movement relative thereto.

8. A connector according to claim 7, wherein the annular support is internally threaded and the bolt is externally threaded, the annular support thread being complementary to the bolt thread.

9. A connector according to claim 8, further comprising a cap, the cap being coupled to the bolt to prevent the annular support from becoming detached from the bolt.

10. A connector according to claim 1, wherein an internal surface of the linkage and an external surface of the skirt of each of said first and second expandable retainers include complementary features that engage to resist rotation of the skirts in the linkage.

11. A connector according to claim 1, wherein the linkage is a hollow elongate member.

12. A connector according to claim 1 wherein the linkage and the first and second hollow elongate members are all tubular members having a circular cross-sectional shape.

13. A connector according to claim 1, comprising a stop received on said linkage, the stop functioning to restrict an extent to which the linkage can be inserted into one or more of the first hollow elongate member or the second hollow elongate member.

14. A tubular support for a cat-tree, the support comprising a first hollow tubular pole, a second hollow tubular pole and a connector according to claim 1, the first expandable retainer being insertable into the first hollow tubular pole and the second expandable retainer being insertable into the second hollow tubular pole to thereby couple together the first and second hollow tubular poles.

15. A cat-tree kit comprising a plurality of hollow tubular poles, a plurality of connectors according to claim 1 for coupling pairs of said hollow tubular poles together, and one or more accessories selected from: a platform, a feeding station and a cat shelter; said one or more accessories being connectable to a said hollow tubular pole.

16. A connector for coupling a first hollow tubular support of a cat tree to a second hollow tubular support of a cat tree, the connector comprising:

a hollow tube having a first end region and a second end region;

a first expandable retainer comprising a base, an expander, a diametrically expandable member and a bolt; said base of said first expandable retainer further comprising a skirt push-fitted into the first end region of the hollow tube to couple the first expandable retainer to the first end region of the hollow tube, and a second expandable retainer comprising a base, an expander, a diametrically expandable member and a bolt; said base of said second expandable retainer further comprising a skirt push-fitted into the second end region of the hollow tube to couple the second expandable retainer to the second end region of the hollow tube, wherein: the first expandable retainer is insertable into an end of the first hollow tubular support and the second expandable retainer is insertable into an end of the second hollow tubular support; and rotation of each of said first and second expandable retainers relative to the hollow tube causes the first or second expandable retainer to expand and couple the connector to the first or second hollow tubular support.

17. A cat-tree support connector means, comprising:

tubular linkage means having a circular cross-section, a first expandable retaining means comprising a base, an expander, a diametrically expandable member and a bolt; said base of said first expandable retaining means further comprising a skirt push-fittable into a first end region of the tubular linkage means to couple the first expandable retaining means to the tubular linkage means at a first end thereof, and a second expandable retaining means comprising a base, an expander, a diametrically expandable member and a bolt; said base of said second expandable retaining means further comprising a skirt push-fittable into a second end region of the tubular linkage means to couple the second expandable retaining means to the tubular linkage means at a second end thereof opposite said first end;

wherein for each of said first and second expandable retaining means: the diametrically expandable member is moveable against the expander to expand the diametrically expandable member when the tubular linkage means is rotated in a first direction relative to each diametrically expandable member, and the diametrically expandable member is moveable away from the expander to permit the diametrically expandable member to contract when the tubular linkage means is rotated in a second direction opposite to said first direction.

* * * * *